Sept. 30, 1969 D. C. MUELLER 3,469,765

BOX

Filed Sept. 30, 1966 6 Sheets-Sheet 1

INVENTOR.
DAVID CHARLES MUELLER
BY Patrick J. Walsh
ATTORNEY

INVENTOR.
DAVID CHARLES MUELLER
BY
Patrick J. Walsh
ATTORNEY

Sept. 30, 1969 D. C. MUELLER 3,469,765

BOX

Filed Sept. 30, 1966 6 Sheets-Sheet 3

INVENTOR.
DAVID CHARLES MUELLER

BY Patrick J. Walsh

ATTORNEY

Sept. 30, 1969 D. C. MUELLER 3,469,765

BOX

Filed Sept. 30, 1966 6 Sheets-Sheet 4

INVENTOR.

DAVID CHARLES MUELLER

BY Patrick J Walsh

ATTORNEY

Sept. 30, 1969 D. C. MUELLER 3,469,765

BOX

Filed Sept. 30, 1966 6 Sheets-Sheet 5

INVENTOR.
DAVID CHARLES MUELLER

BY Patrick J. Walsh

ATTORNEY

INVENTOR.
DAVID CHARLES MUELLER
BY
Patrick J Walsh
ATTORNEY

United States Patent Office 3,469,765
Patented Sept. 30, 1969

3,469,765

BOX

David Charles Mueller, Neenah, Wis., assignor to American Can Company, New York, N.Y., a corporation of New Jersey Filed Sept. 30, 1966, Ser. No. 583,404
Int. Cl. B65d *1/22, 5/02*
U.S. Cl. 229—33 7 Claims

ABSTRACT OF THE DISCLOSURE

A box and a blank for making the box is cut and creased from sheet material such as paperboard. The box includes a receptacle and a cover portion with means associated with the cover for limiting the opening movement of the cover with respect to the receptacle. In one embodiment of the invention, the cover is of double wall construction and is connected to one of the receptacle walls which is also of double wall construction. In this embodiment, a scored zone is interposed between the receptacle outer wall and the cover outer panel to form a hinge for giving the desired folding action to the cover. A method for forming the box from the blank is disclosed in connection with this first embodiment. A second embodiment in the invention includes a double wall cover wherein the outer panel of the double cover has a terminal edge cooperating with the receptacle rear wall for limiting cover movement in the opening direction.

This invention relates to containers and more particularly to a box which is made from sheet material, preferably paperboard, and which is particularly useful for packaging cigars.

Cigar boxes in present use are generally made from individual panels of wood or chipboard pasted together by a paper liner. The paper liner covers the inside and the outside of the box and a paper strip forms a hinge connection between the cover and the receptacle portions of the box. The paper liner may be printed for decorating the box and identifying the cigars. After manufacture, the boxes are shipped empty to a cigar factory for packaging cigars.

Shipping empty boxes is uneconomical.

The present invention provides a box made from a unitary blank of sheet material, preferably paperboard, which eliminates the need for assembling the box from separate components. The surface of the unitary blank may be printed to decorate the box and identify the cigars. The blank can be folded flat for economical shipment to a cigar factory for easy fabrication into a cigar box.

The box according to this invention includes a unique construction which enables a tobacconist to hold the box by its cover in the traditional manner of offering cigars to a customer.

Accordingly, an object of the invention is to provide a unitary blank which may be formed from sheet material, preferably paperboard, and which blank may easily be fabricated into a box.

Another object of the invention is to provide a box of unitary construction which is formed from a unitary sheet material blank.

A further object of the invention is to provide a unitary blank which can be folded flat for shipment and easily set up for filling.

Another object of the invention is to provide a box especially constructed to enable a tobacconist to hold the box cover in the traditional manner of offering cigars to a customer.

Other and further objects of the invention will be apparent from an understanding of the preferred embodiment set forth in the description and claims and will occur to one skilled in the art in practicing the invention.

A preferred embodiment has been selected for illustrating the principles of the invention and is shown in the accompanying drawings wherein.

Figure 1:
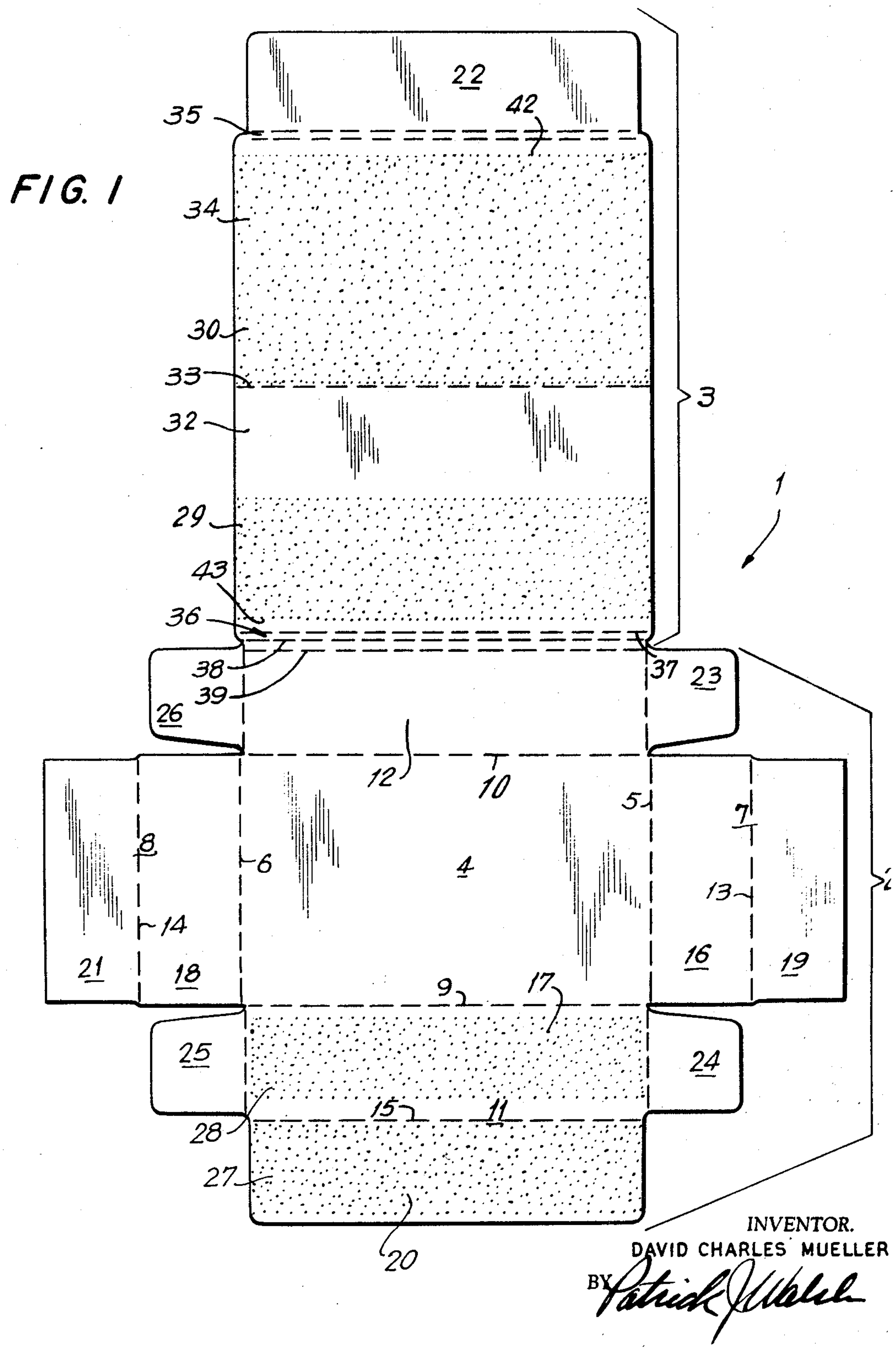
FIGURE 1 is a plan view of a blank of sheet material for fabricating a box according to the invention.

Referring now to FIGURE 1 of the drawings, the box according to the present invention is made from a suitably cut and scored blank. Any suitable sheet material may be used for the blank and typically paperboard may be used. The blank 1 includes a receptacle portion 2 and and a cover portion 3. Preferably the receptacle and cover are of double walled construction for extra strength and rigidity.

The receptacle 2 of the blank includes a bottom panel 4 joined by suitable scored lines 5 and 6 to a pair of side walls 7 and 8 and by other scored lines 9 and 10 to a front wall 11 and a rear wall 12. A double thickness of paperboard adds to the strength and rigidity of the walls of the receptacle portion of the box. Accordingly, each of the sides 7, 8 and front 11 walls is divided by a scored line 13–15 into an exterior panel 16–18 and an inner panel 19–21. When the blank is folded as more fully described below, an anchor panel 22 (shown at the top of FIGURE 1) adheres to and gives double thickness to the rear wall 12. End closure flaps 23–26 join the front and rear walls 11 and 12 to the side walls 13 and 14 of the receptacle by means of an adhesive when the receptacle is formed.

The cover portion 3 of the blank is double walled construction and includes an exterior cover wall 32 joined by a scored line 33 to an inner cover wall 34. A reverse scored line 35 joins the anchor panel 22 to the cover wall 34. The reverse scored line permits folding action of the anchor panel in reverse to the folding action of the receptacle panels (see FIG. 3).

The cover 3 (FIG. 1) is connected to the receptacle by a scored zone 36. As more fully described below, the scored zone 36 includes a plurality, preferably three adjacent scored lines 37–39 to give the desired hinging action of the double walled cover 3 with respect to the double rear wall (rear wall 12 and anchor panel 22) of the receptacle.

The double wall construction of the carton requires a special folding technique and a preferred sequence for applying glue in order to form a box from the blank. The formation of a box from the blank will be described now with particular reference to the folding and adhesive sequences.

Figure 2:
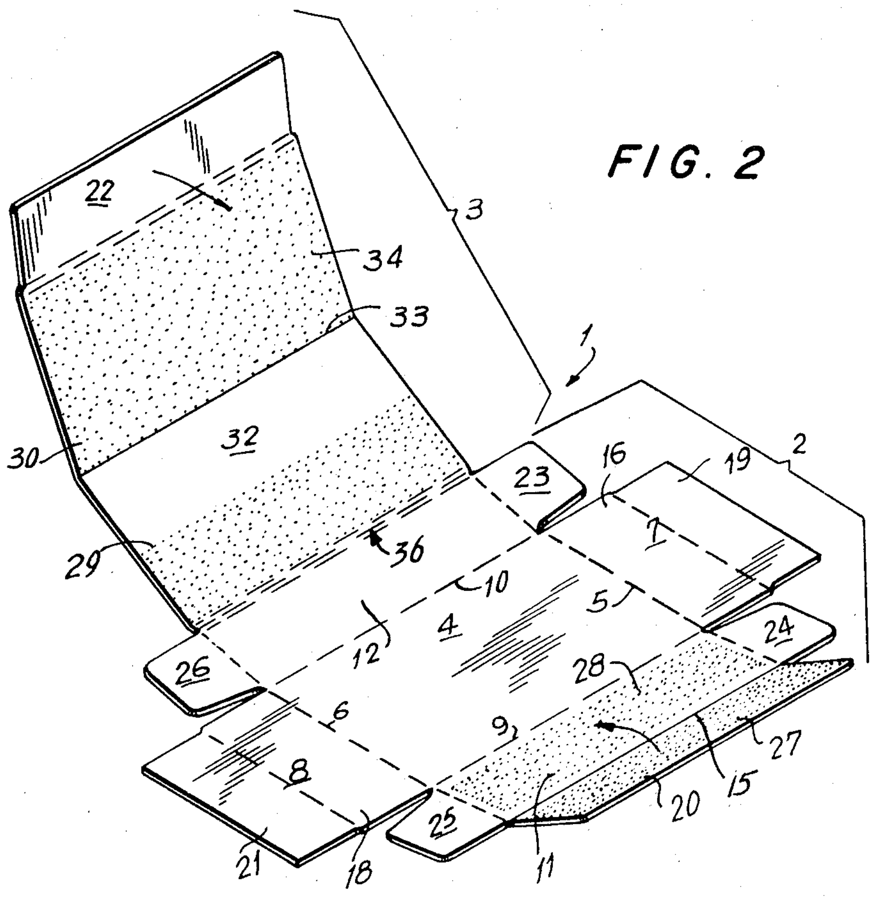
FIGURE 2 is a perspective view illustrating the blank of FIGURE 1 in partially folded condition.

First, the front wall and the cover receive adhesive in the stippled areas 27–30 indicated in FIG. 1. This adhesive may be applied by a suitable gluing machine. Next (FIG. 2) the cover 3 is folded along the scored line 33 and the exterior and inner cover walls 32 and 34 are adhered together by the adhesive 29 and 30. Meanwhile, the front receptacle wall 11 may be formed by folding the inner panel 20 over the scored line 15 and securing the inner panel 20 to the exterior panel by adhesive 27 and 28. Thus, the cover 3 and front wall 11 are of double wall construction.

In the next formation step (FIG. 3) a strip of suitable adhesive is applied to the rear wall 12 as indicated by the stippled area 40. The anchor panel 22 is held out of the way during application of glue to the rear wall. After the glue 40 has been applied, the anchor panel 22 is folded (FIG. 4) down onto the rear wall 12 to give a double walled construction to the rear wall. Before the rear wall glue 40 sets, the cover must be folded about the scored zone 36 to give a suitable hinge action between the cover and the rear wall.

Figures 4, 4A, 5, 5A:
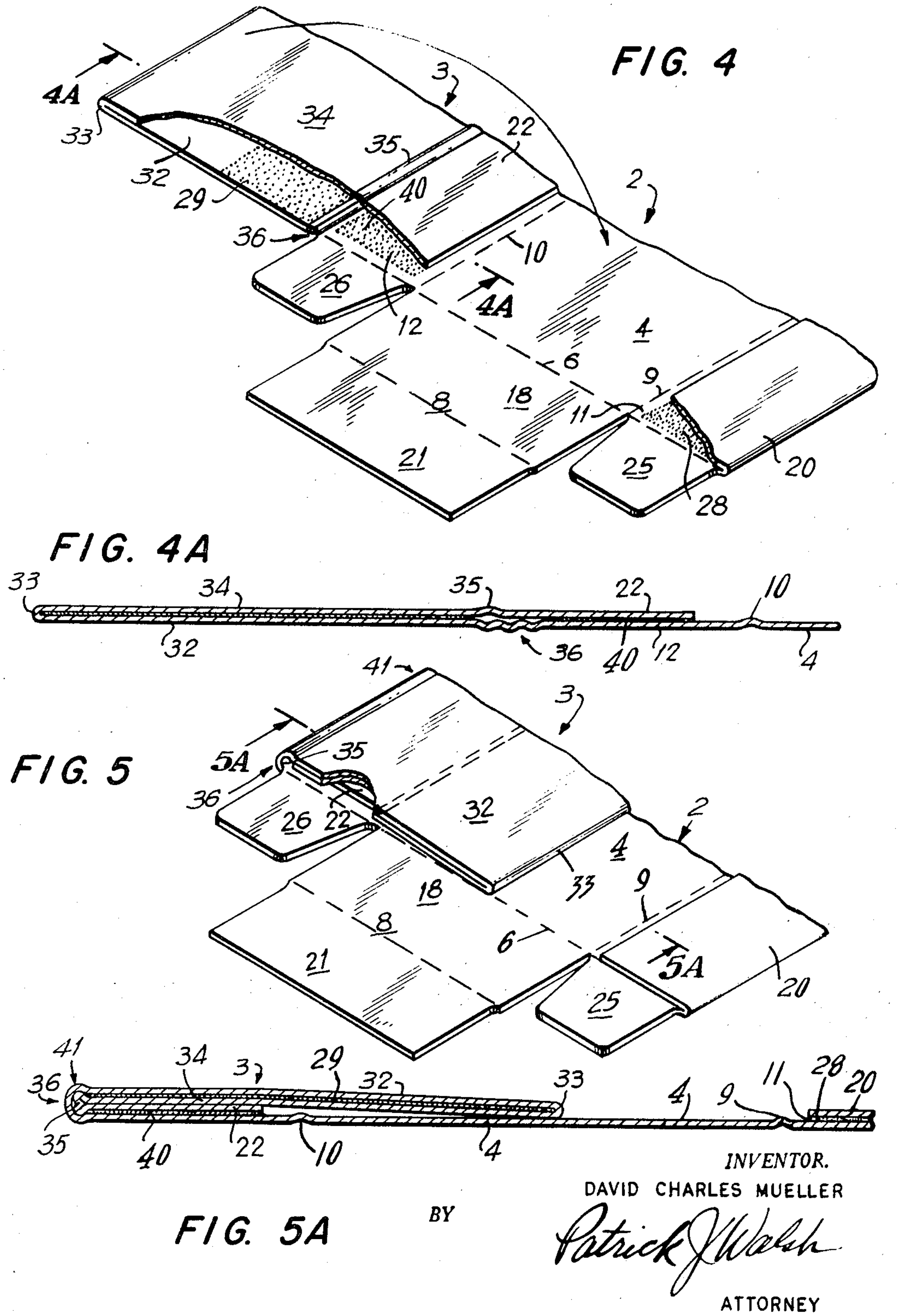
FIGURE 4 is an enlarged fragmentary view of the blank of FIGURES 1–3 showing the blank with cover panels and front wall folded.
FIGURE 4A is a section view along line 4A—4A of FIGURE 4.
FIGURE 5 is an enlarged fragmentary view of the blank of FIGURE 4 illustrating the cover panels folded again into position for setting an adhesive bond between panels.
FIGURE 5A is a section view along line 5A—5A of FIGURE 5.

As indicated by the arrow in FIG. 4, the cover 3 folds about the scored zone 36 to the position shown in FIG. 5. As the fold is executed, FIGS. 5 and 5A, the anchor panel 22 shifts and the reverse scored line 35 moves into position in the middle of the scored zone 36. Thus, the scored line 35 and the scored zone 36 define a hinge 41 between the double walls of both the cover and the rear wall. The unset glue 40 allows shifting of the anchor panel 22 and the scored line 35 during hinge formation. The hinge is formed when the glue 40 sets. In this manner the exterior and interior cover walls may hinge freely and smoothly about a common axis from a closed position to an open position up to about 180° removed from the closed position.

Figure 3:
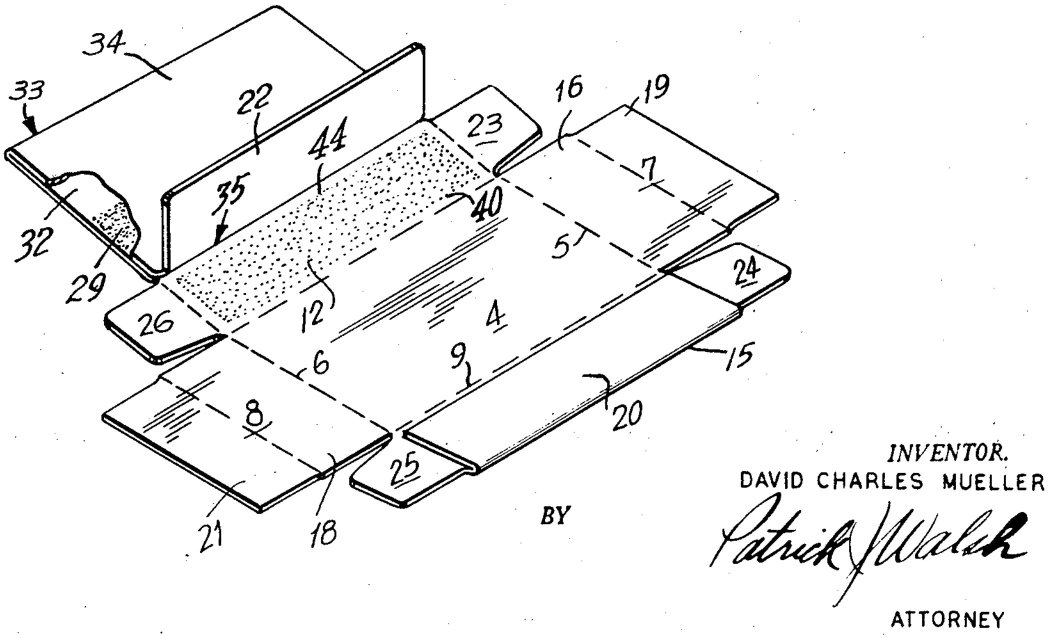
FIGURE 3 is a perspective view of the blank illustrated in FIGURE 2 which has been folded further.

It will be observed in FIGURES 1 and 5A that the scored zone 36 of the hinge 41 is free of adhesive. By this lack of adhesive, the exterior and inner walls of the hinge 41 are free to shift slightly with respect to each other to facilitate the hinging action. As best shown in FIGURES 1 and 3 a preferred spacing of about five-sixteenths (5/16) of an inch between the scored lines 35, 37 and 39 and the edges respectively 42, 43, 44 of the adhesive areas prevents binding of the inner and exterior hinge walls in a typical sized 50 count cigar box.

When the blank has been folded to the position illustrated in FIGURE 5, cover formation is complete and the receptacle may be formed. The front wall has also been formed and the partially folded blank may be shipped in flat condition to a cigar factory for set up and filling with cigars.

Figures 6, 7, 8, 8A, 9, 10:
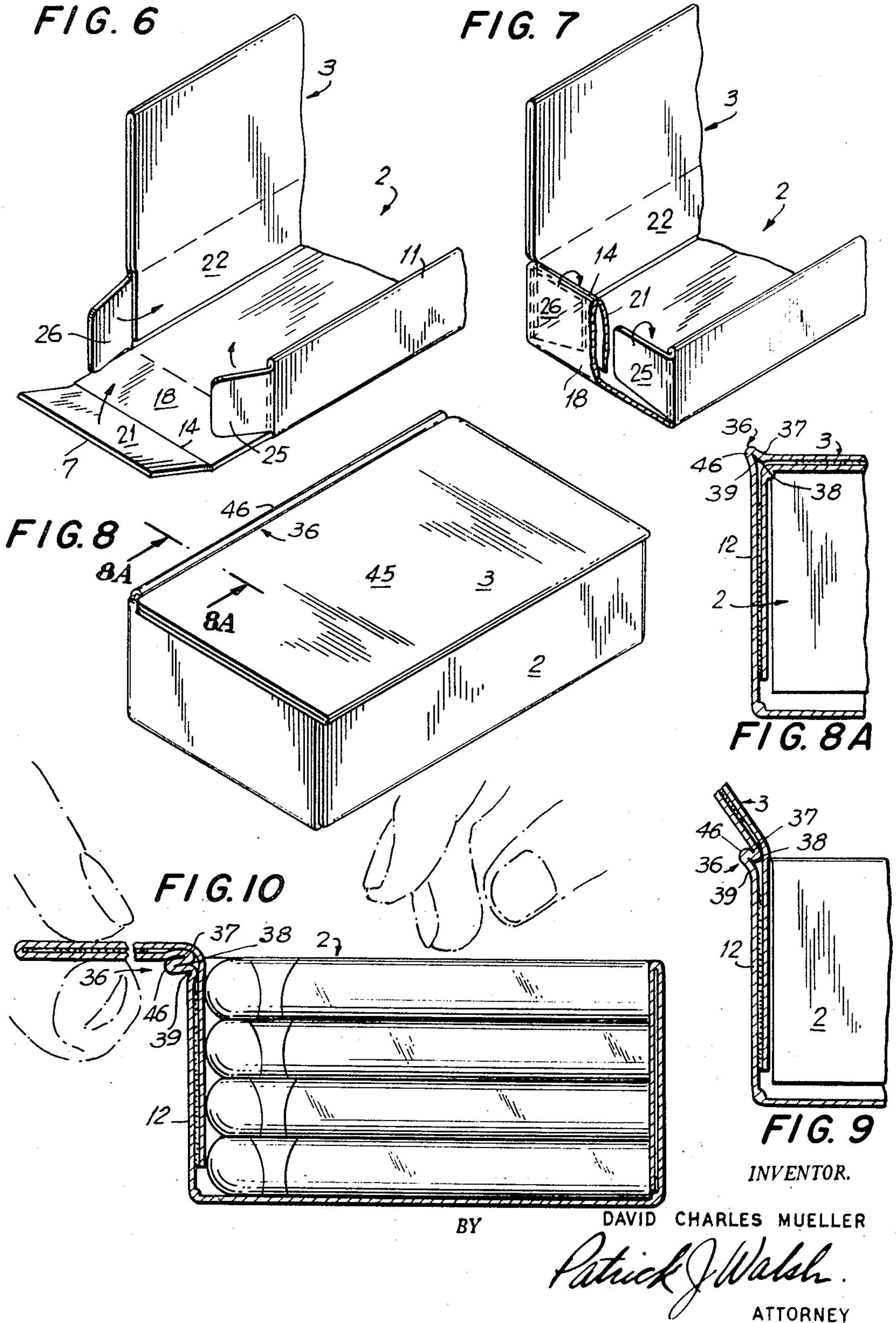
FIGURE 6 is a fragmentary view of the blank of FIGURES 1 through 5 illustrating an end closure for the receptacle portion of the box.
FIGURE 7 is a fragmentary view partially broken away of the end closure of the carton illustrated in FIGURE 6.
FIGURE 8 is a perspective view of the box according to the present invention.
FIGURE 8A is a section view taken along line 8A—8A of FIGURE 8.
FIGURE 9 is a section view of the box particularly illustrating the hinge connection between the cover and receptacle portions of the box.
FIGURE 10 is a section view of the box of the present invention with the cover partly broken illustrating the traditional manner for holding the cigar box when offering cigars.

In setting up the receptacle as shown in FIGURES 6 and 7, the end closure flaps 23–26 pivot into position and the side walls 7 and 8 fold over and adhere to the end closure flaps. Both side walls 7 and 8 of the receptacle are erected in the manner illustrated in FIGURES 6 and 7. A suitable adhesive may be applied to the inner surfaces of the side walls 7 and 8 prior to forming the side walls of the box. Adhesive placed in this manner will secure each side wall 7 and 8 to both sides of each end closure flap 23–26. The closed box 45 is shown in FIG. 8.

One of the important features of the present invention resides in the hinge between the cover and the receptacle of the box. As best shown in FIGURES 8, 8A, 9 and 10, the scored zone 36 forms an outwardly extending ridge 46 when the box is formed. More specifically, the outer scored lines 37 and 39 of the scored zone 36 cooperate with the middle scored line 38 to define the ridge 46 in the outer wall of the hinge. The ridge is shown in FIGURES 8 and 8A. As the cover is opened (FIGURES 9 and 10) the ridge 46 acts like a wedge between the cover 3 and the rear wall 12 of the receptacle 2. The wedge action limits the cover movement in the opening direction to approximately 180° from the closed position. Of course, the construction of the wedge may be varied as desired for greater or lesser limits to the opening position. By this arrangement the box can be held by its cover for offering cigars in the traditional manner.

Figure 11:
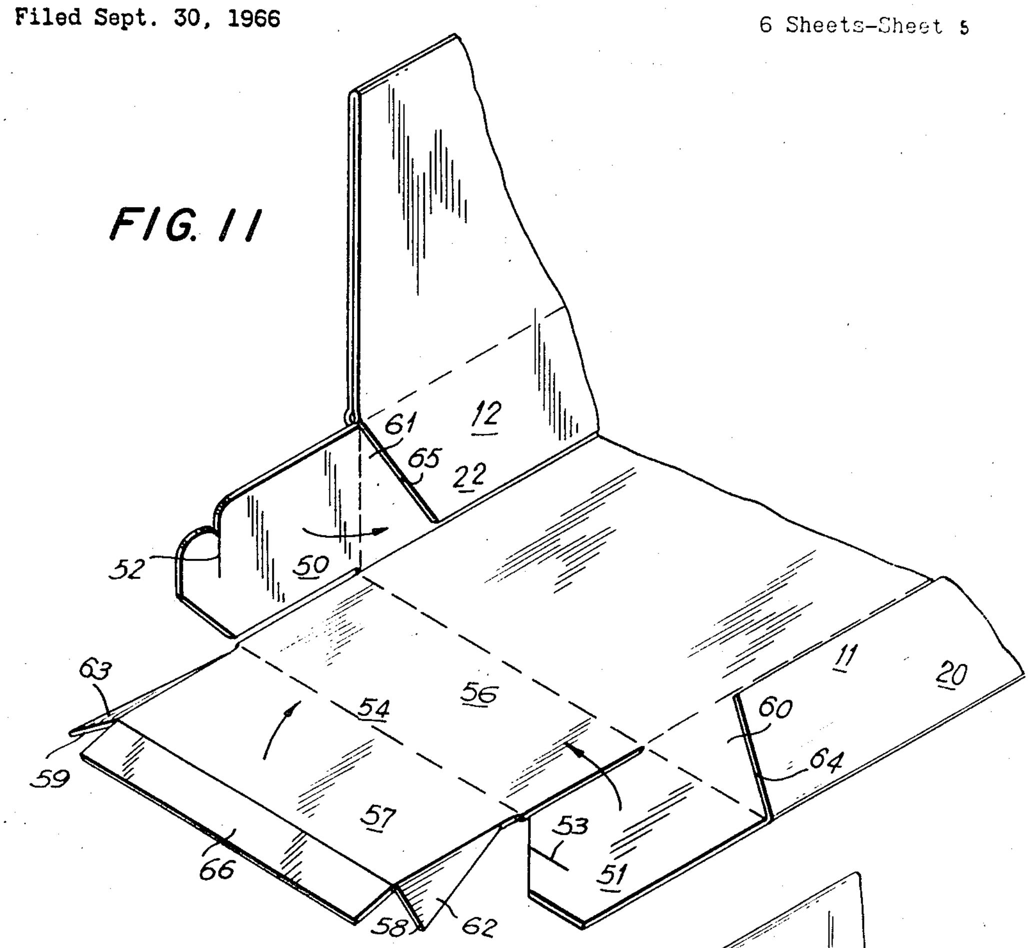
FIGURE 11 is an enlarged fragmentary view of a box according to the present invention which has a modified end closure construction.
Figure 12:
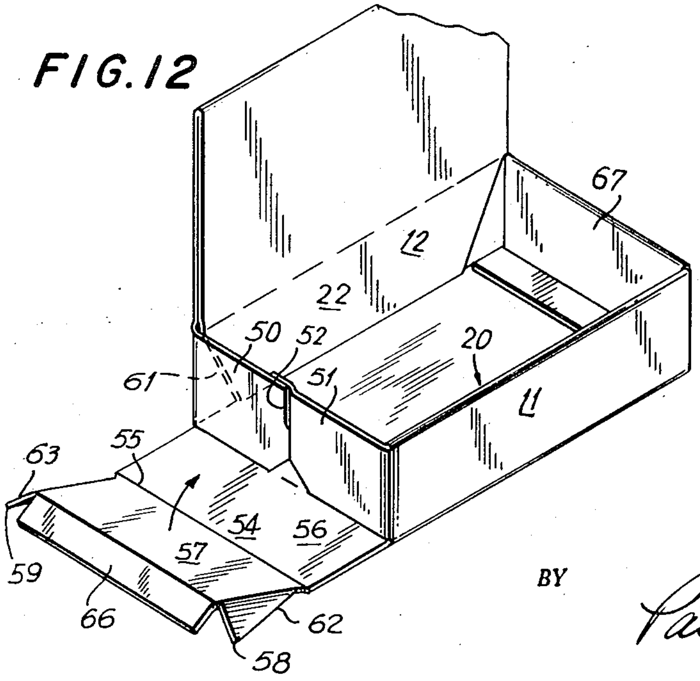
FIGURES 12 and 13 are perspective views illustrating the manner of setting up the end closure of the modified box of FIGURE 11.
Figure 13:
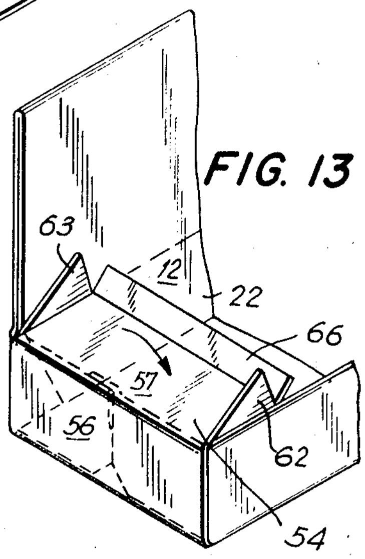

A modified end closure for the cigar box is illustrated in FIGURES 11 through 13. This modified end closure eliminates the need for adhesive in forming the end closures. In the following description the same numbers indicate corresponding parts of the box shown in FIGURES 1 through 10. Since both end closures are similar, only one need be described.

The modified end closure includes a pair of end closure flaps 50 and 51 slotted at 52 and 53 and pivoted by scored lines to the receptacle front 11 and rear walls 12. The slotted flaps 50 and 51 pivot about the scored lines and interlock slot to slot in the position shown in FIGURE 12.

The side wall 54 folds over a scored line 55 to form exterior 56 and inner 57 panels. The inner panel 57 includes a pair of tabs 58 and 59 which register with suitable recesses 60 and 61 in the front and rear walls. The recesses are cut away portions of the inner front panel 20 and the anchor panel 22. The tabs 58 and 59 serve as a lock in that the diagonal edge 62 and 63 of each tab cooperates with the diagonal edges 64 and 65 of the respective front and rear panel recesses to resist movement of the tabs from each recessed area. Additionally, a supplemental panel 66 may be included on the inner end panel to hold the locking tabs in position in the recessed areas. As shown in FIGURE 12 each side wall 54 and 67 moves over the interlocked flaps 50 and 51 and the locking tabs 58 and 59 snap into the recesses for securing each end closure.

FIGURES 14 through 17 illustrate a modified embodiment of the present invention. The modified box 70 includes a receptacle portion 71 and a cover portion 72.

The receptacle portion 71 of the modified box 70 may be the same as that illustrated in FIGURES 1 through 9 except that the rear wall 73 is of single wall construction, since the cover 72 construction is modified and does not include an anchor panel.

Figures 14, 15, 15A, 16, 16A, 17:
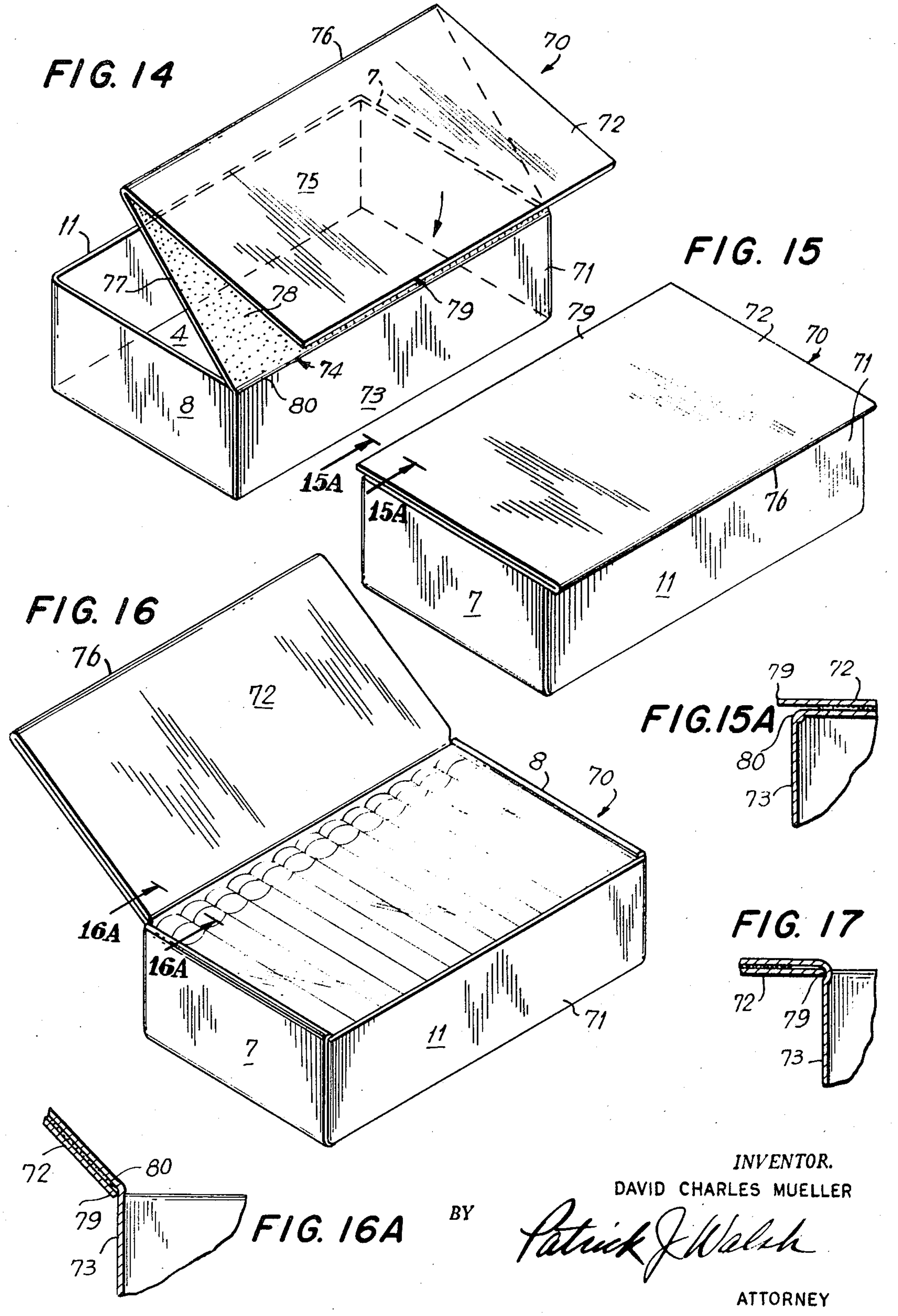
FIGURE 14 illustrates a modified box according to the present invention.
FIGURE 15 illustrates the box in FIGURE 14 with its cover closed.
FIGURE 15A is a section view along line 15A—15A of FIGURE 15.
FIGURE 16 is a perspective view illustrating the cigar box in FIGURE 14 with its cover in an open position.
FIGURE 16A is a section view taken along line 16A—16A of FIGURE 16.
FIGURE 17 is a section view corresponding to FIGURE 16A illustrating the box cover in a fully open position.

A single scored line 74 joins the cover 72 to the upper edge of the rear wall 73 of the receptacle 71. The cover includes an exterior panel 75 joined by a scored line 76 to an inner panel 77. The exterior panel 75 is slightly wider than the inner panel and when joined as by adhesive 78, the exterior panel has a free edge 79 which extends beyond the corresponding edge 80 of the inner panel 77. This is best illustrated in FIGURE 15A. The purpose of the extension 79 is to provide a wedge which cooperates with the rear receptacle panel 71 to limit the movement of the cover 72 to an angle of about 180° from a closed position to an open position. In this way, the box 70 may be used for selling cigars in the traditional manner of holding the cover of the box. If desired, the free edge 79 may be adjusted as desired to achieve an intermediate obtuse angle with respect to the closed position. Although the foregoing embodiments of the invention have been disclosed with particular reference to cigar boxes, it is to be understood that such reference is intended in an illustrative manner and that, of course, the embodiments of the present invention may be used for packaging other products.

It will be observed that applicant has invented a new and useful cigar box which simplifies the manufacture and shipment of the box and which provides a box having strength and rigidity.

Having thus described my invention, I claim:

1. A hinge construction for a carton having a double panel cover and a double panel receptacle wall comprising an outer hinge member having a plurality of generally parallel scored lines and being connected to an outer receptacle panel and an outer cover panel, an inner hinge member connecting the inner cover panel to the inner receptacle panel, the inner hinge member having a scored line therein, said scored line being aligned in generally parallel relationship and being juxtaposed in a generally central relationship with the scored lines of the other hinge member, means for securing the outer and inner cover panels to each other, means for securing the outer and inner receptacle panels together, and each of said securing means being excluded from the interface portions of the inner and outer hinge members to allow the hinge members to shift slightly with respect to each other when opening the cover.

2. A box formed from a unitary blank of sheet material comprising a receptacle having a bottom panel and wall panels at least one wall of the receptacle having an outer panel and an inner panel, a cover having an outer panel and an inner panel, an outer hinge member having a scored zone comprising plurality of generally parallel scored lines integrally connected to one edge of the outer receptacle panel and to one edge of the outer cover panel, an inner hinge member connecting the inner cover panel to the inner receptacle panel, the inner hinge member having a scored line therein, said scored line being aligned in generally parallel relationship and being juxtaposed in a generally central relationship with the scored zone of the outer hinge member, means for securing the outer and inner cover panels to each other, means for securing the outer and inner receptacle panels together, and each of said securing means being excluded from the interface portions of the hinge members to allow the hinge members to shift slightly with respect to each other when the hinge member is operating.

3. In a box having a double panel receptacle wall including an inner wall panel and an outer wall panel and a double panel cover including an inner cover panel and an outer cover panel the improvement which comprises an outer hinge member having a scored zone with three generally parallel scored lines and being connected to the outer wall panel and to the outer cover panel, an inner hinge member connecting the inner cover panel to the inner wall panel, the inner hinge member having a scored line therein, said scored line being aligned in generally parallel relationship to and being juxtaposed in a generally central relationship with the scored zone of the outer hinge member, adhesion means for securing the outer and inner cover panels to each other, adhesive means for securing the outer and inner wall panels together, and said adhesive means excluded from the vicinity of the hinge to allow the hinge members to flex with respect to each other when the cover is opened or closed.

4. A box formed from a unitary blank of sheet material comprising a receptacle having a bottom panel and wall panels at least one wall of the receptacle having an outer panel and an inner panel, a cover having an outer panel and an inner panel, an outer hinge member having a scored zone comprising a plurality of generally parallel scored lines and being connected to an outer receptacle panel and an outer cover panel, an inner hinge member connecting the inner cover panel to the inner receptacle panel, the inner hinge member having a score line therein, said score line being aligned in generally parallel relationship and being juxtaposed in a generally central relationship with the score zone of the outer hinge member, adhesive means for securing the outer and inner cover panels to each other, adhesive means for securing the outer and inner receptacle panels together, each of said adhesive means excluded from the interface between the hinge members to allow the hinge members to flex with respect to each other when the hinge member is operating, and the outer surface of the scored zone adapted to define a wedge for limiting the extent to which the cover may be opened.

5. A carton comprising a receptacle including a bottom panel and receptacle walls, a cover having a first panel connected by a first scored line to one of the receptacle walls, said cover having a second panel connected by a second scored line to the first panel, said second panel having a terminal edge which extends in co-planar relationship with said second panel, said terminal edge extending beyond the first score line when the cover is folded about the second score line so that the terminal edge engages the upper portion of said one of the receptacle walls so to limit the movement of the cover when the cover is moved in an opening direction.

6. The method of forming a double walled hinge in a box fabricated from a layer of sheet material with the hinge connecting a double walled cover to a double walled receptacle panel comprising the steps of forming a scored zone having a plurality of closely adjacent score lines intermediate the ends of the layer, forming a second score line in said layer in spaced and generally parallel relation to the scored zone, forming a third score line in said layer equally spaced from said scored zone and said second score line and being in generally parallel relation to the scored zone and the second score line, folding the layer about the third score line to form the double walled cover and the double wall receptacle panel and further to form the double walled hinnge with the second scored line and the scored zone in alignment and in face-to-face relationship, securing the double layer in face to face contact with an adhesive, and folding the double layer about the scored zone before the adhesive sets so that the double walled hinge may be properly aligned for movement after the adhesive sets.

7. The method of forming a double walled hinge defined by claim 6 wherein adhesive is excluded from the interface portion of the double walled hinge, and wherein the double layer is folded so that the double walled cover substantially overlies the double walled receptacle panel for setting the adhesive.

(References on following page)

References Cited

UNITED STATES PATENTS

| | | | |
|---|---|---|---|
| 1,758,230 | 5/1930 | Lange. | |
| 1,851,442 | 3/1932 | Neely | 229—44 |
| 1,970,580 | 8/1934 | Snyder et al. | 229—44 |
| 2,326,281 | 8/1943 | Becker | 229—44 |
| 2,672,274 | 3/1954 | Crane | 229—44 |
| 2,122,885 | 7/1938 | Lowey | 229—33 |
| 2,130,488 | 9/1938 | Funk | 229—44 |

FOREIGN PATENTS

| | | |
|---|---|---|
| 593,177 | 8/1959 | Italy. |
| 714,466 | 8/1954 | Great Britain. |
| 1,141,220 | 12/1962 | Germany. |

JOSEPH R. LECLAIR, Primary Examiner

U.S. Cl. X.R.

93—36; 206—45.29; 229—34, 44